United States Patent
Sekine

(10) Patent No.: US 11,929,061 B2
(45) Date of Patent: Mar. 12, 2024

(54) SPEECH ANALYSIS SYSTEM

(71) Applicant: Interactive Solutions Corp., Tokyo (JP)

(72) Inventor: Kiyoshi Sekine, Tokyo (JP)

(73) Assignee: Interactive Solutions Corp., Tokyo (JP)

( * ) Notice: Subject to any disclaimer, the term of this patent is extended or adjusted under 35 U.S.C. 154(b) by 726 days.

(21) Appl. No.: 17/042,193

(22) PCT Filed: Jan. 6, 2020

(86) PCT No.: PCT/JP2020/000074
§ 371 (c)(1),
(2) Date: Sep. 28, 2020

(87) PCT Pub. No.: WO2020/153110
PCT Pub. Date: Jul. 30, 2020

(65) Prior Publication Data
US 2021/0020164 A1 Jan. 21, 2021

(30) Foreign Application Priority Data
Jan. 25, 2019 (JP) ................. 2019-011603

(51) Int. Cl.
*G10L 15/08* (2006.01)
*G06F 3/16* (2006.01)
*G10L 25/27* (2013.01)

(52) U.S. Cl.
CPC ............... *G10L 15/08* (2013.01); *G06F 3/16* (2013.01); *G10L 25/27* (2013.01); *G10L 2015/088* (2013.01)

(58) Field of Classification Search
CPC ..... G06F 3/16; G10L 15/08; G10L 2015/088; G10L 25/27
See application file for complete search history.

(56) References Cited

U.S. PATENT DOCUMENTS 7,127,398 B1 * 10/2006 Yamagishi .......... G10L 15/1822
704/E15.04
2012/0253819 A1 * 10/2012 Hasegawa ............... G10L 25/51
704/E11.001

(Continued)

FOREIGN PATENT DOCUMENTS

JP 11-259269 A 9/1999
JP 2000-148185 A 5/2000

(Continued)

OTHER PUBLICATIONS

Office Action of Canadian Patent Application No. 3,097,683 dated Dec. 7, 2020 (5 pages).

(Continued)

*Primary Examiner* — Eric Yen
(74) *Attorney, Agent, or Firm* — Pyprus Pte Ltd; George D. Liu

(57) ABSTRACT

To provide a voice analysis system capable of performing voice recognition with higher accuracy. A voice analysis system including a first voice analysis terminal and a second voice analysis terminal, the first voice analysis terminal obtaining first conversation information, and the second voice analysis terminal obtaining second conversation information, wherein the voice analysis system comprises a conversation category selection unit which compares the number of related words included in the first conversation information and the number of related words included in the second conversation information, in each conversation category, and adopts the conversation category with the larger number of related words as a correct conversation category.

6 Claims, 5 Drawing Sheets

(56) References Cited

U.S. PATENT DOCUMENTS

2017/0094047 A1* 3/2017 Todasco ................ H04M 3/493
2019/0347330 A1* 11/2019 Osamura ................ G10L 15/22

FOREIGN PATENT DOCUMENTS

| JP | 2002259635 A | 9/2002 |
| JP | 2010-55020 A | 3/2010 |
| JP | 2017224052 A | 12/2017 |

OTHER PUBLICATIONS

International Search Report of International Patent Application No. PCT/JP2020/000074 completed Mar. 3, 2020 and dated Mar. 17, 2020 (4 pages).
Written Opinion of International Patent Application No. PCT/JP2020/000074 completed Mar. 3, 2020 and dated Mar. 17, 2020 (3 pages).

* cited by examiner

SPEECH ANALYSIS SYSTEM

TECHNICAL FIELD

The present invention relates to a voice analysis system. In more detail, the present invention relates to a voice analysis system that effectively uses a plurality of terminals configured to record a voice to enhance accuracy.

BACKGROUND ART

JP-A-2002-259635 describes a system that displays keywords from statements made by participants in an argument during the argument in combination of drawing objects and texts.

JP-A-2017-224052 describes a presentation evaluation device using a voice analysis terminal.

Although recognizing conversations by voice using one voice analysis terminal allows comparatively accurately performing voice analysis of conversations of a user close to the voice analysis terminal, there is a problem that voice analysis of conversations of a user who is far from the voice analysis terminal cannot be accurately performed.

Patent Document 1: JP-A-2002-259635
Patent Document 2: JP-A-2017-224052

DISCLOSURE OF THE INVENTION

Problems to be Solved by the Invention

An object of the invention of an aspect described in this Specification is to provide a voice analysis system that ensures further highly accurately performing voice recognition.

Solutions to the Problems

The invention of an aspect is basically based on knowledge that voice recognition by mutual use of conversation information analyzed by a plurality of voice analysis devices allows performing the voice recognition with further high accuracy.

The invention of an aspect described in this Specification relates to a voice analysis system 1.

This voice analysis system 1 is a system including a first voice analysis terminal 3 and a second voice analysis terminal 5. This terminal includes a computer, and respective elements described below are elements implemented by the computer.

The first voice analysis terminal 3 is a terminal that includes a first term analysis unit 7, a first conversation storage unit 9, an analysis unit 11, a presentation storage unit 13, a related term storage unit 15, and a display unit 17.

The first term analysis unit 7 is an element configured to analyze a word included in a conversation to obtain first conversation information.

The first conversation storage unit 9 is an element configured to store the first conversation information analyzed by the first term analysis unit 7.

The analysis unit 11 is an element configured to analyze the first conversation information stored by the first conversation storage unit 9.

The presentation storage unit 13 is an element configured to store a plurality of presentation materials.

The related term storage unit 15 is an element configured to store related terms related to the respective presentation materials stored in the presentation storage unit 13. The display unit 17 is an element configured to display any of the presentation materials stored by the presentation storage unit 13.

The second voice analysis terminal 5 is a terminal that includes a second term analysis unit 21 and a second conversation storage unit 23.

The second term analysis unit 21 is an element configured to analyze the word included in the conversation to obtain second conversation information. The second conversation storage unit 23 is an element configured to store the second conversation information analyzed by the second term analysis unit 21.

The first voice analysis terminal 3 further includes a conversation information reception unit 25.

The conversation information reception unit 25 is an element configured to receive the second conversation information from the second voice analysis terminal 5. The first conversation storage unit is configured to also store the second conversation information received by the conversation information reception unit 25.

The analysis unit 11 includes a specific presentation information obtaining unit 31, a conversation section obtaining unit 33, a related term extraction unit 35, and a conversation section selection unit 37.

The specific presentation information obtaining unit 31 is an element configured to receive information on a selection of a specific presentation material as a certain presentation material among the plurality of presentation materials.

The conversation section obtaining unit 33 is an element configured to analyze a conversation section in the first conversation information to obtain one or a plurality of conversation sections.

The related term extraction unit 35 is an element configured to extract the related terms related to the specific presentation material included in the first conversation information and the second conversation information.

The conversation section selection unit 37 is an element configured to compare a number of related terms included in the first conversation information with a number of related terms included in the second conversation information in the respective conversation sections obtained by the conversation section obtaining unit 33. The conversation section selection unit 37 is configured to employ the conversation section with the larger number of related terms as a correct conversation section.

In a preferred aspect of the voice analysis system 1, the first voice analysis terminal 3 further includes a clock time storage unit 41 configured to store a clock time and a period.

In this system, the first conversation information includes a clock time related to each word together with the words included in the conversation. The conversation section obtaining unit 33 is configured to analyze the conversation section using clock time information for each word. Since it is found from a pause in conversation that a speaker has changed, it is found from a period between words that the conversation section has changed.

In a preferred aspect of the voice analysis system 1, the first voice analysis terminal 3 further includes a frequency analysis unit 43 configured to analyze a frequency of a voice included in the conversation.

In this system, the first conversation information includes the frequency of the voice related to each word together with the words included in the conversation.

The conversation section obtaining unit 33 is configured to analyze the conversation section using the frequency of each word. Since it is found from a change in tone of the voice that the speaker has changed, it is found through analysis of the frequency of a sound of each word that the conversation section has changed.

In a preferred aspect of the voice analysis system 1, the related term stored by the related term storage unit 15 includes a presenter related term and a listener related term. The conversation section obtaining unit 33 is configured to use the presenter related term and the listener related term included in the conversation information to analyze the conversation section.

Since a presenter related term used by the presenter and a term stated by a listener are different, each term is analyzed to ensure separating the conversation sections.

In a preferred aspect of the voice analysis system 1, the first voice analysis terminal 3 further includes an incorrect conversion term storage unit 45 configured to store an incorrect conversion term related to each of the plurality of presentation materials.

The analysis unit 11 is configured such that when the incorrect conversion term related to the specific presentation material is included, the analysis unit 11 corrects a term included in the correct conversation section using a term corresponding to the incorrect conversion term included in the correct conversation section among terms included in a conversation section not employed as the correct conversation section among the respective conversation sections. Mutual collation of the information between the first voice analysis terminal 3 and the second voice analysis terminal 5 allows obtaining a highly accurate analysis result.

In a preferred aspect of the voice analysis system 1, the second voice analysis terminal 5 further includes a second analysis unit 51, a second presentation storage unit 53, a second related term storage unit 55, a second display unit 57, and a second conversation information reception unit 59. The second conversation storage unit 23 also stores the first conversation information received by the second conversation information reception unit 59. The second analysis unit 51 includes a second specific presentation information obtaining unit 61, a second conversation section obtaining unit 63, a second related term extraction unit 65, and a second conversation section selection unit 67.

The second analysis unit 51 is an element configured to analyze the second conversation information stored by the second conversation storage unit 23.

The second presentation storage unit 53 is an element configured to store second presentations as a plurality of the presentation materials stored in the second voice analysis terminal 5.

The second related term storage unit 55 is an element configured to store the related terms related to the respective second presentation materials. The second display unit 57 is an element configured to display any of the presentation materials stored by the second presentation storage unit 53.

The second conversation information reception unit 59 is an element configured to receive the first conversation information from the first voice analysis terminal 3.

The second conversation storage unit 23 is configured to also store the first conversation information received by the second conversation information reception unit 59.

The second analysis unit 51 includes the second specific presentation information obtaining unit 61, the second conversation section obtaining unit 63, the second related term extraction unit 65, and the second conversation section selection unit 67.

The second specific presentation information obtaining unit 61 is an element configured to receive information on a selection of a second specific presentation material as a certain presentation material among the second presentations.

The second conversation section obtaining unit 63 is an element configured to analyze the conversation section in the second conversation information to obtain one or a plurality of the conversation sections.

The second related term extraction unit 65 is an element configured to extract related terms related to the second specific presentation material included in the first conversation information and the second conversation information.

The second conversation section selection unit 67 is an element configured to compare a number of related terms included in the first conversation information with a number of related terms included in the second conversation information in the respective conversation sections obtained by the second conversation section obtaining unit 63. The second conversation section selection unit 67 is configured to employ the conversation section with the larger number of related terms as the correct conversation section.

Effects of the Invention

This Specification can provide a voice analysis system that can perform voice recognition with further high accuracy.

DESCRIPTION OF PREFERRED EMBODIMENTS

Hereinafter, configurations to embody the present invention will be described using the drawings. The present invention is not limited to the configurations described below and includes configurations appropriately modified within a scope apparent by the person skilled in the art from the following configurations.

The invention of an aspect described in this Specification relates to a voice analysis system 1. The voice analysis system is a system to receive sound information, such as a conversation, as input information and analyze the received sound information to obtain a conversational sentence. The voice analysis system is implemented by a computer. Note that a system that replaces the sound information with character information is publicly known, and the present invention can appropriately use the configuration of the known system. This system may be implemented by a mobile terminal (a computer terminal, such as a mobile phone) or may be implemented by a computer or a server.

Figure 1:
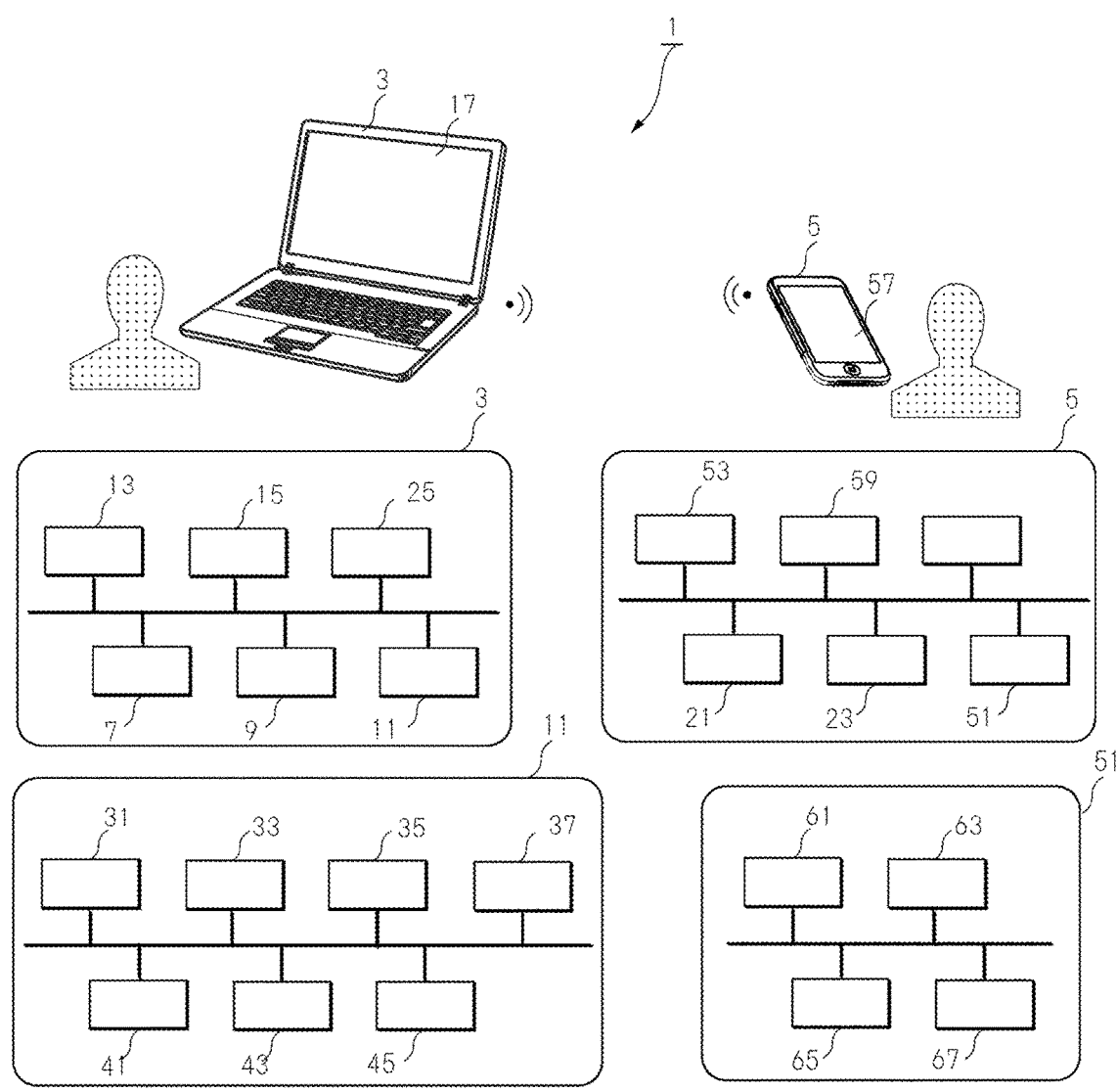
FIG. 1 is a block diagram illustrating an exemplary configuration of a voice analysis system.

FIG. 1 is a block diagram illustrating an exemplary configuration of the voice analysis system. This voice analysis system 1 is a system including a first voice analysis terminal 3 and a second voice analysis terminal 5. This terminal includes the computer, and respective elements described below are elements implemented by the computer.

The computer includes an input/output unit, a control unit, a calculation unit, and a storage unit, and the respective elements are coupled by a bus or the like so as to ensure transmitting or receiving information. For example, the control unit reads a control program stored in the storage unit and causes the calculation unit to perform various kinds of calculations using information stored in the storage unit and information input from the input/output unit. The information obtained by the calculation by the calculation unit is stored in the storage unit and also output from the input/output unit. Thus, various kinds of arithmetic processing is performed. Elements described below each may correspond to any of the elements in the computer.

The first voice analysis terminal 3 is a terminal that includes a first term analysis unit 7, a first conversation storage unit 9, an analysis unit 11, a presentation storage unit 13, a related term storage unit 15, a display unit 17, and a conversation information reception unit 25.

The first term analysis unit 7 is an element configured to analyze a word included in a conversation to obtain first conversation information. A voice is input to the first voice analysis terminal 3 via, for example, a microphone. Then, the first voice analysis terminal 3 stores the conversation (voice) in the storage unit. The first term analysis unit 7 analyzes the word included in the conversation and obtains the first conversation information. The first conversation information is conversion of the voice into sound information. An example of the sound information is like "KOREKARA TONYOBYO NI KANSURU SHINYAKU DEARU EKKU WAI ZEE NITSUITE SETSUMEI SHIMASU SOREWA KETTOUCHI WO SAGEMASUKA (which means "Now the XYZ as a new medicine for diabetes will be described. Does it lower the blood glucose level?" in hiragana characters)".

The first conversation storage unit 9 is an element configured to store the first conversation information analyzed by the first term analysis unit 7. For example, the storage unit in the computer functions as the first conversation storage unit 9. The first conversation storage unit 9 stores the sound information described above in the storage unit.

The analysis unit 11 is an element configured to analyze the first conversation information stored by the first conversation storage unit 9. The analysis unit 11 reads the sound information stored in the storage unit and searches for a term stored in the storage unit to convert the sound information into an appropriate term. In this respect, when a convertible term (homonym) is present, a term with a high frequency of used together with another term may be selected to increase conversion efficiency. For example, "TONYOBYO (which means "diabetes" in hiragana characters)" is converted into "diabetes". Candidates for conversion of "SHINYAKU (which means "new medicine" in hiragana characters in this case)" include "new medicine", "new", "new translation", and "new role". Among them, "new medicine", which has a high frequency of appearance together with "diabetes", is selected as the term included in the conversation information. Then, the sound information stored in the storage unit is analyzed as a conversational sentence like "Now the XYZ as a new medicine for diabetes will be described. Does it lower the Duel blood. ('the Duel blood' in kanji characters is incorrect in this case)". The analyzed conversational sentence is stored in the storage unit.

The analysis unit 11 may use the related term read related to the presentation material to increase analysis accuracy of the conversation information. For example, when a part of the conversation information "SHINYAKU (which means "new medicine" in hiragana characters in this case)" is present and "new medicine" is present as the related term, it is only necessary to analyze this "SHINYAKU (which means "new medicine" in hiragana characters in this case)" and select "new medicine". This allows enhancing analysis accuracy. In a case where a plurality of phonetic spellings are assigned to the related term and the conversation information includes it, the corresponding related term may be selected. For example, candidates for phonetic spelling of the related term "XYZ" are phonetic spellings of "XYG", "XYZ", "EXYG", and "EXYZ".

The presentation storage unit 13 is an element configured to store the plurality of presentation materials. For example, the storage unit in the computer functions as the presentation storage unit. An example of the presentation material is each page of PowerPoint (registered trademark). The presentation material is a material stored in the computer and displayed in the display unit to ensure performing the presentation to a person in conversation or an audience.

The related term storage unit 15 is an element configured to store the related terms related to the respective presentation materials stored in the presentation storage unit 13. For example, the storage unit in the computer functions as related term storage unit. An example of the plurality of related terms related to the presentation material includes terms possibly used for description based on the respective pages of PowerPoint. The storage unit stores the plurality of related terms related to the respective pages of the presentation material, such as PowerPoint. The storage unit stores the plurality of related terms related to the presentation material related to information (for example, a file ID and a page number) of the presentation material. Examples of the related term include "diabetes," "new medicine," "XYZ," "ABC" (name of another therapeutic agent), "blood glucose level," "side effect," "blood sugar," "glaucoma," "retinopathy," "insulin," "DC pharmaceutical," and "insert." The related terms especially preferably include homonyms. In the above-described example, in addition to "new medicine," "blood sugar" (besides, "formation of a party", "pedigree", "duel", "KETTO (name of a place)", "KETTO (name of a place)", and "duel" are included) are preferably included as the related terms. Including the homonyms as the related terms allows improving analysis accuracy.

The display unit 17 is an element configured to display any of the presentation materials stored by the presentation storage unit 13. Examples of the display unit 17 include a monitor and a display. The computer reads the information on the presentation material stored in the storage unit and displays the presentation material in the monitor and a screen. Thus, the presentation material can be displayed for the person in conversation and the audience.

The second voice analysis terminal 5 is a terminal that includes a second term analysis unit 21 and a second conversation storage unit 23. For example, the first voice analysis terminal 3 is a notebook computer or the like that is carried by an explainer, such as an MR, present near the person who gives the description, and accurately records the voice of the explainer. Meanwhile, the second voice analysis terminal 5 is installed so as to be closer to the audience than the explainer, such as a position closer to a doctor than the MR, to further accurately record a voice of the person who hears the description. Examples of the second voice analysis terminal 5 include a microphone and a mobile terminal (such as a mobile phone and a smart phone). The second voice analysis terminal 5 is configured to transmit or receive the information to/from the first voice analysis terminal 3. For example, the information may be directly transmitted and received between the first voice analysis terminal 3 and the second voice analysis terminal 5, or the information can be transmitted and received via a server.

The second term analysis unit 21 is an element configured to analyze the word included in the conversation to obtain the second conversation information. An example of the second conversation information includes "KOREKARA TONYUBYO NI KANSURU SHINYAKU DEARU EKKU WAI ZEE NITSUITE SETSUMEI SHIMASU SOREWA KETTOUCHI WO SAGEMASUKA (which means "Now the XYZ as a new medicine for diabetes will be described. Does it lower the blood glucose level?" in hiragana characters)". The second voice analysis terminal 5 stores the conversation input from, for example, the microphone in the storage unit. The second term analysis unit 21 reads the conversation from the storage unit and refers to the terms stored in the storage unit to obtain the conversation information. An example of the second conversation information includes "Now the XYZ 'TONYUBYO NI KANSURU SHINYAKU' will be described. Does it lower the blood glucose level? ('TONYUBYO NI KANSURU SHIN-YAKU' in kanji characters is incorrect in this case)".

The second conversation storage unit 23 is an element configured to store the second conversation information analyzed by the second term analysis unit 21. The storage unit functions as the second conversation storage unit 23. That is, the second conversation information is stored in the storage unit of the second voice analysis terminal 5. The second conversation information stored in the storage unit of the second voice analysis terminal 5 is transmitted to the first voice analysis terminal 3 via, for example, an output unit, such as an antenna of the second voice analysis terminal 5.

Then, the first voice analysis terminal 3 receives the second conversation information transmitted from the second voice analysis terminal 5. The conversation information reception unit 25 in the first voice analysis terminal 3 is an element configured to receive the second conversation information from the second voice analysis terminal 5. For example, an antenna of the first voice analysis terminal 3 functions as the conversation information reception unit 25. The second conversation information is input to the first voice analysis terminal 3 via the conversation information reception unit 25 and stored in the storage unit. For example, the first conversation storage unit may also store the second conversation information received by the conversation information reception unit 25.

The analysis unit 11 includes a specific presentation information obtaining unit 31, a conversation section obtaining unit 33, a related term extraction unit 35, and a conversation section selection unit 37.

The specific presentation information obtaining unit 31 is an element configured to receive information on a selection of a specific presentation material as a certain presentation material among the plurality of presentation materials. For example, the MR selects a PowerPoint (registered trademark) material regarding XYZ as the new medicine for diabetes. Then, the information that the page has been selected is input in the computer via an input device of the computer. It is only necessary to treat the input information as information on the selection of the specific presentation material.

The conversation section obtaining unit 33 is an element configured to analyze a conversation section in the first conversation information to obtain one or a plurality of conversation sections. The conversation section obtaining unit 33 may also analyze the conversation section in the second conversation information to obtain one or a plurality of the conversation sections. The conversation section is a conversation part usually separated by a Japanese period (°). The conversation section may be one sentence. Reasonably, depending on the conversation, the conversation section is not necessarily the same as that of written word.

For example, two conversation sections, "KOREKARA TONYOBYO NI KANSURU SHINYAKU DEARU EKKU WAI ZEE NITSUITE SETSUMEI SHIMASU (which means "Now the XYZ as a new medicine for diabetes will be described)" and "SOREWA KETTOUCHI WO SAGE-MASUKA (which means "Does it lower the blood glucose level?" in hiragana characters)" are obtained from "KORE-KARA TONYOBYO NI KANSURU SHINYAKU DEARU EKKU WAI ZEE NITSUITE SETSUMEI SHIMASU SOREWA KETTOUCHI WO SAGEMASUKA (which means "Now the XYZ as a new medicine for diabetes will be described. Does it lower the blood glucose level?" in hiragana characters)". Alternatively, two conversation sections, "Now the XYZ as a new medicine for diabetes will be described." and "Does it lower the Duel blood. ('the Duel blood' in kanji characters is incorrect in this case)" are obtained from "Now the XYZ as a new medicine for diabetes will be described. Does it lower the Duel blood. ('the Duel blood' in kanji characters is incorrect in this case)". The method for obtaining the conversation section is publicly known. Hereinafter, an example of the method for obtaining the conversation section (embodiments) will be described.

In a preferred aspect of the voice analysis system 1, the first voice analysis terminal 3 further includes a clock time storage unit 41 configured to store a clock time and a period. In this system, the first conversation information includes a clock time related to each word together with the words included in the conversation. The conversation section obtaining unit 33 is configured to analyze the conversation section using clock time information for each word. For example, when a silent state continues for a certain period of time or more after a voice continues for a certain period of time, it can be said that the conversation section has changed. It can be found from a period between words that the conversation section has changed. In this case, for example, the storage unit in the computer causes the first conversation storage unit to store the first conversation information and causes the clock time storage unit 41 to associate each piece of the information of the first conversation information with the clock time and store it. Then, for example, when the analysis unit 11 analyzes the first conversation information, the clock times of the respective pieces of conversation information are read, thus ensuring obtaining the time interval. A threshold stored in the storage unit is read, the read threshold is compared with the obtained time interval, and when the time interval is larger than the threshold, it may be determined to be a conversation section. The second voice analysis terminal 5 also preferably includes a second clock time storage unit to store a clock time and a period. Then, collating the periods of the conversations allows grasping a correspondence relationship between each section of the first conversation information and each section of the second conversation information.

In a preferred aspect of the voice analysis system 1, the first voice analysis terminal 3 further includes a frequency analysis unit 43 configured to analyze a frequency of the voice included in the conversation. In this system, the first conversation information includes the frequency of the voice related to each word together with the words included in the conversation. The conversation section obtaining unit 33 is configured to analyze the conversation section using the frequency of each word. Since it is found from a change in tone of the voice that the speaker has changed, it is found through analysis of the frequency of a sound of each word that the conversation section has changed. In this case as well, it is only necessary that the storage unit is caused to store frequency information of the voice associated with each piece of the information included in the conversation information, the frequency information that is caused to be stored in the storage unit by the analysis unit 11 is read, a change in frequency is obtained, and the conversation section is obtained from this. Additionally, the storage unit may store the terms indicative of the conversation sections in advance, and when the conversation information includes the term indicative of the conversation section, it may be determined to be a conversation section. Examples of the term indicative of the conversation section include "DESU. (which means "It is . . . " in hiragana characters)", "DEHA-NAIDESHOKA. (which means "It should be . . . " in hiragana characters)", "DESUKA. (which means "Is it . . . ?" in hiragana characters)", "NARUNODESU. (which means "It will make . . . ?" in hiragana characters)", "DESHOKA. (which means "Should it . . . ?" in hiragana characters)", "GOZAIMASU. (which means "It is supposed to be . . . " in hiragana characters)", "ITADAKIMASU. (which means "I receive . . . " in hiragana characters)", "NARIMASU. (which means "It becomes . . . " in hiragana characters)", and "E- (which means "Eh" in hiragana characters)".

In a preferred aspect of the voice analysis system 1, the related term stored by the related term storage unit 15 includes a presenter related term and a listener related term. The conversation section obtaining unit 33 is configured to use the presenter related term and the listener related term included in the conversation information to analyze the conversation section. Since a presenter related term used by the presenter and a term stated by a listener are different, each term is analyzed to ensure separating the conversation sections.

The related term extraction unit 35 is an element configured to extract the related terms related to the specific presentation material included in the first conversation information and the second conversation information.

For example, since "diabetes," "new medicine," "XYZ," "ABC" (name of another therapeutic agent), "blood glucose level," "side effect," "blood sugar," "glaucoma," "retinopathy," "insulin," "DC pharmaceutical," and "insert" are stored in the storage unit related to a material name (present position) and its page number of a certain presentation, the related term extraction unit 35 reads these related terms related to the specific presentation material from the storage unit. Arithmetic processing for whether to match the term included in the first conversation information with the related term is performed. The matched related term is stored in the storage unit together with the conversation information and the conversation sections.

For example, the first conversation information is formed of the two conversation sections, and the first conversation section, "Now the XYZ as a new medicine for diabetes will be described." includes the three related terms "diabetes," "new medicine," and "XYZ". Meanwhile, the related term is not present in the second conversation section of the first conversation information. For example, the first voice analysis terminal 3 stores the related terms "diabetes," "new medicine," and "XYZ" and the value of 3 regarding the first conversation section of the first conversation information. Note that only the value of 3 may be stored, or only the related terms may be stored regarding this conversation section. The same applies to the second conversation section and the next second conversation information.

The first conversation section of the second conversation information "Now the XYZ 'TONYUBYO NI KANSURU SHINYAKU' will be described. ('TONYUBYO NI KANSURU SHINYAKU' in kanji characters is incorrect in this case)" includes one related term "XYZ." Meanwhile, the second conversation section of the second conversation information "Does it lower the blood glucose level?" includes one related term "blood glucose level."

The conversation section selection unit 37 is an element configured to compare the number of related terms included in the first conversation information with the number of related terms included in the second conversation information in the respective conversation sections obtained by the conversation section obtaining unit 33. The conversation section selection unit 37 is configured to employ the conversation section with the larger number of related terms as a correct conversation section.

For example, the conversation section selection unit 37 reads the value of 3 from the storage unit regarding the first conversation section of the first conversation information, and reads the value of 1 regarding the first conversation section of the second conversation information. Then, a calculation to compare the read values is performed. As a result, it is found that the first conversation information has the number of related terms included in the first conversation section larger than that of the second conversation information. Then, the conversation section selection unit 37 employs the first conversation section of the first conversation information (for example, "Now the XYZ as a new medicine for diabetes will be described.") as the correct conversation section.

Similarly, the conversation section selection unit 37 employs the second conversation section of the second conversation information ("Does it lower the blood glucose level?") as the correct conversation section.

In a preferred aspect of the voice analysis system 1, the first voice analysis terminal 3 further includes an incorrect conversion term storage unit 45 configured to store an incorrect conversion term related to each of the plurality of presentation materials.

The analysis unit 11 is configured such that when the incorrect conversion term related to the specific presentation material is included in each conversation section of the conversation information employed as the correct conversation section, the analysis unit 11 corrects a term included in the correct conversation section using a term corresponding to the incorrect conversion term included in the correct conversation section among terms included in a conversation section not employed as the correct conversation section among the respective conversation sections. Mutual collation of the information between the first voice analysis terminal 3 and the second voice analysis terminal 5 allows obtaining a highly accurate analysis result.

For example, when "XYZ" is present as the related term related to the specific presentation material, "XYG" is present as the incorrect conversion term. When the first conversation section of the first conversation information is "Now the XYG as a new medicine for diabetes will be described.", "XYG" is more likely to be corrected as "XYZ". Meanwhile, "XYZ" is included in the first conversation section of the second conversation information. Accordingly, the analysis unit corrects "XYG" as the incorrect conversion term of the first conversation section of the first conversation information using "XYZ" included in the second conversation section. Thus, "Now the XYG as a new medicine for diabetes will be described." can be corrected to the correct conversation information like "Now the XYZ as a new medicine for diabetes will be described." In this work, the analysis unit 11 reads the incorrect conversion term from the storage unit and performs arithmetic processing whether the term included in the conversation section determined to be correct matches the incorrect conversion term. When the term included in the conversation section matches the incorrect conversion term, the term corresponding to the incorrect conversion term included in the conversation section not employed as the correct conversation section among the respective conversation sections is read. Especially, when the read corresponding term is the related term or the correct term stored related to the incorrect conversion term, it is only necessary to perform a process to replace it with the term, store the conversation section in which the incorrect conversion term has been replaced is in the storage unit, and update the correct conversation section.

In a preferred aspect of the voice analysis system 1, the second voice analysis terminal 5 further includes a second analysis unit 51, a second presentation storage unit 53, a second related term storage unit 55, a second display unit 57, and a second conversation information reception unit 59. The second conversation storage unit 23 also stores the first conversation information received by the second conversation information reception unit 59. The second analysis unit 51 includes the second specific presentation information obtaining unit 61, a second conversation section obtaining unit 63, a second related term extraction unit 65, and a second conversation section selection unit 67. These respective elements are basically similar to the corresponding elements of the first voice analysis terminal 3.

The second analysis unit 51 is an element configured to analyze the second conversation information stored by the second conversation storage unit 23.

The second presentation storage unit 53 is an element configured to store second presentations as a plurality of the presentation materials stored in the second voice analysis terminal 5.

The second related term storage unit 55 is an element configured to store the related terms related to the respective second presentation materials.

The second display unit 57 is an element configured to display any of the presentation materials stored by a second presentation storage unit 53.

The second conversation information reception unit 59 is an element configured to receive the first conversation information from the first voice analysis terminal 3.

The second conversation storage unit 23 is configured to also store the first conversation information received by the second conversation information reception unit 59.

The second analysis unit 51 includes the second specific presentation information obtaining unit 61, the second conversation section obtaining unit 63, the second related term extraction unit 65, and the second conversation section selection unit 67.

The second specific presentation information obtaining unit 61 is an element configured to receive information on a selection of a second specific presentation material as a certain presentation material among the second presentations.

The second conversation section obtaining unit 63 is an element configured to analyze the conversation section in the second conversation information and obtain one or a plurality of the conversation sections.

The second related term extraction unit 65 is an element configured to extract related terms related to the second specific presentation material included in the first conversation information and the second conversation information.

The second conversation section selection unit 67 is an element configured to compare the number of related terms included in the first conversation information with the number of related terms included in the second conversation information in the respective conversation sections obtained by the second conversation section obtaining unit 63. The second conversation section selection unit 67 is configured to employ the conversation section with the larger number of related terms as the correct conversation section.

Similarly to the first voice analysis terminal, the second voice analysis terminal of the system of this aspect can obtain the correct conversation section. Accordingly, the processes of the respective elements are similar to those of the above-described aspects.

An aspect described in this Specification relates to a program. This program is a program that causes the computer to function as the first term analysis unit 7, the first conversation storage unit 9, the analysis unit 11, the presentation storage unit 13, the related term storage unit 15, the display unit 17, and the conversation information reception unit 25. This program can be a program to implement the system of each aspect described above. This program may employ an aspect of an application installed on the mobile terminal.

An aspect described in this Specification relates to a computer-readable information recording medium storing the program described above. Examples of the information recording medium include a CD-ROM, a DVD, a floppy disk, a memory card, and a memory stick.

Figure 2:
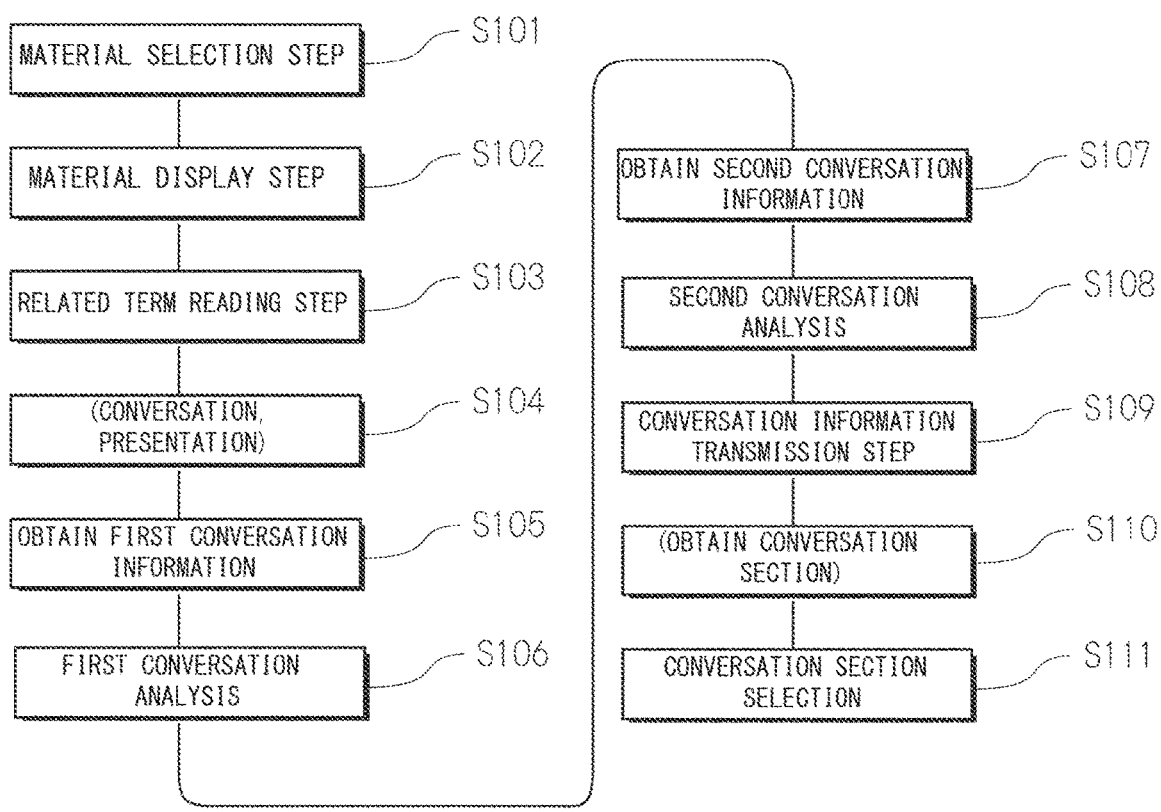
FIG. 2 is a flowchart depicting a process example of the voice analysis system.
Figure 3:
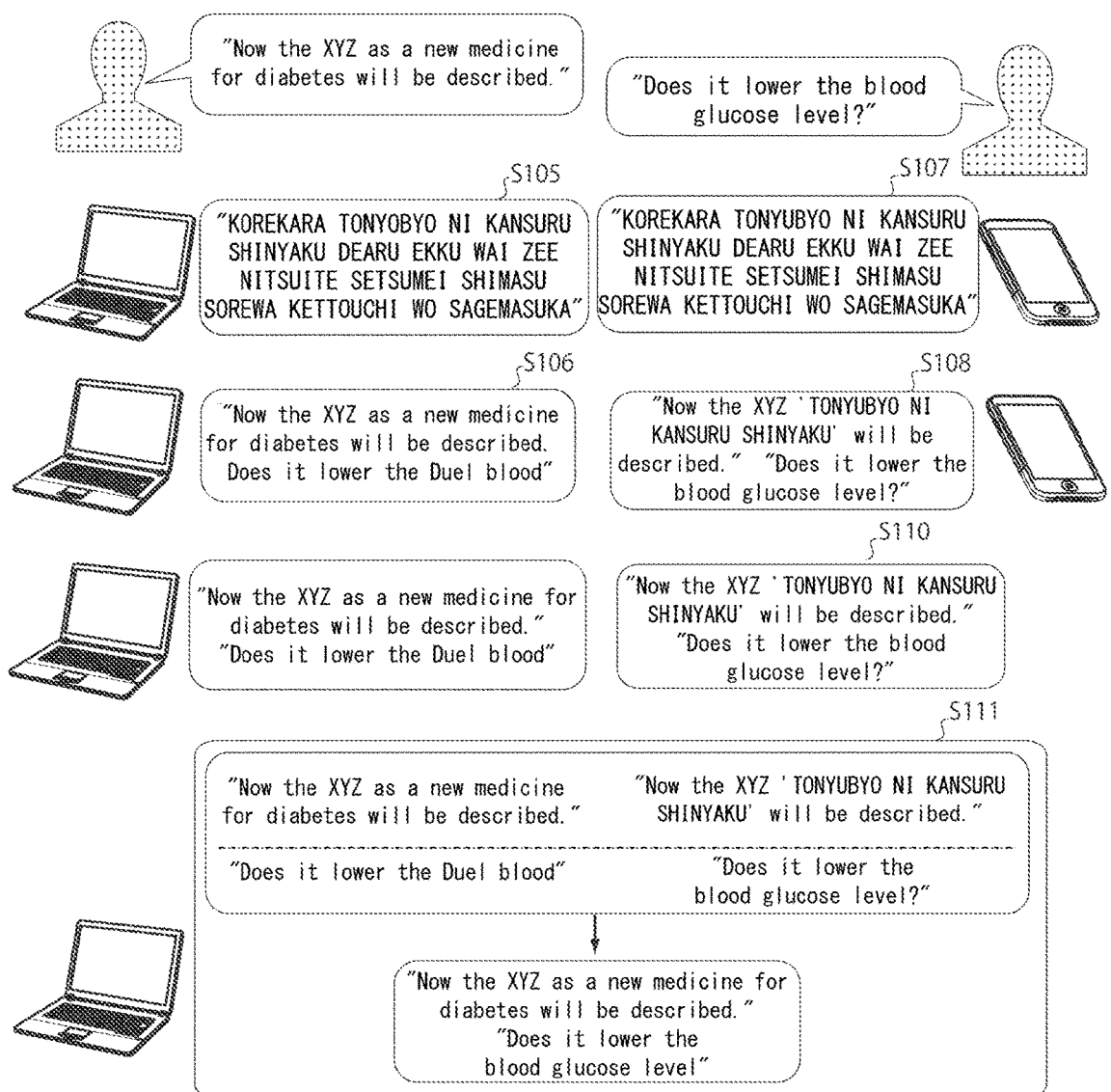
FIG. 3 is a conceptual diagram illustrating a process example of the voice analysis system.

FIG. 2 is a flowchart depicting a process example of the voice analysis system. FIG. 3 is a conceptual diagram illustrating a process example of the voice analysis system. The above-described program has been installed on the two mobile terminals. One terminal is, for example, a notebook computer for an MR and the remaining mobile terminal is a smart phone placed near the doctor as the other person so as to easily pick up the voice of the other person. The application implementing the above-described program has been installed on the notebook computer and the smart phone.

Presentation Material Selection Step (S101)

The MR opens PowerPoint (registered trademark) stored in the notebook computer or read from the server. Then, information on the selection of the PowerPoint (registered trademark) is input to the personal computer.

Presentation Material Display Step (S102)

A display unit of the notebook computer displays a page of the PowerPoint (registered trademark). Meanwhile, a display unit of the smart phone also displays the page of the PowerPoint (registered trademark).

Related Term of Presentation Material Reading Step (S103)

Meanwhile, related to the page of the PowerPoint (registered trademark), the related terms related to the presentation material on the page are read from the storage unit. Examples of the read related terms include "diabetes," "new medicine," "XYZ," "ABC" (name of another therapeutic agent), "blood glucose level," "side effect," "blood sugar," "glaucoma," "retinopathy," "insulin," "DC pharmaceutical," and "insert."

Conversation Based on Presentation Material (S104)

The MR and the doctor have a conversation about the displayed material. The conversation may be a presentation or may be a description. Examples of the conversation include "Now the XYZ as a new medicine for diabetes will be described." "Does it lower the blood glucose level?" (FIG. 3).

First Conversation Information Obtaining Step (S105)

The notebook computer records the conversations and inputs it in the computer. The notebook computer analyzes words included in the conversations to obtain the first conversation information. An example of the first conversation information before the analysis includes "KOREKARA TONYOBYO NI KANSURU SHINYAKU DEARU EKKU WAI ZEE NITSUITE SETSUMEI SHIMASU SOREWA KETTOUCHI WO SAGEMASUKA (which means "Now the XYZ as a new medicine for diabetes will be described. Does it lower the blood glucose level?" in hiragana characters)". The notebook computer is installed on the MR side to excellently pick up the voice of the MR. The conversation information is stored in the storage unit.

First Conversation Analysis Step (S106)

For example, the first conversation information after the analysis is a conversational sentence like "Now the XYZ as a new medicine for diabetes will be described. Does it lower the Duel blood ('the Duel blood' in kanji characters is incorrect in this case)". The analyzed conversational sentence is stored in the storage unit. Note that, in this first conversation information, the conversation section may be analyzed. In the case, an example of the conversation section is like "Now the XYZ as a new medicine for diabetes will be described." and "Does it lower the Duel blood ('the Duel blood' in kanji characters is incorrect in this case)". The conversation section may be analyzed in a later step.

Second Conversation Information Obtaining Step (S107)

The conversations are input to and stored in the smart phone as well. The conversations are analyzed by a started application in the smart phone as well. An example of the second conversation information includes "KOREKARA TONYUBYO NI KANSURU SHINYAKU DEARU EKKU WAI ZEE NITSUITE SETSUMEI SHIMASU SOREWA KETTOUCHI WO SAGEMASUKA (which means "Now the XYZ as a new medicine for diabetes will be described. Does it lower the blood glucose level?" in hiragana characters)". The notebook computer and the smart phone differ in the installed positions, directions of sound pickup, and the like. Accordingly, even when the same conversation is analyzed, there is a difference in the analyzed conversation between the notebook computer (first voice analysis terminal) and the smart phone (second voice analysis terminal). This step is usually performed simultaneously with the first conversation information obtaining step (S105).

Second Conversation Analysis Step (S108)

The second conversation information is analyzed also on the smart phone side. An example of the second conversation information is like "Now the XYZ 'TONYUBYO NI KANSURU SHINYAKU' will be described. Does it lower the blood glucose level? ('TONYUBYO NI KANSURU SHINYAKU' in kanji characters is incorrect in this case)". The conversation section may be analyzed at this time. The second conversation in which the conversation section has been analyzed is like "Now the XYZ 'TONYUBYO NI KANSURU SHINYAKU' will be described. ('TONYUBYO NI KANSURU SHINYAKU' in kanji characters is incorrect in this case)" and "Does it lower the blood glucose level?" The second conversation information is also appropriately stored in the storage unit.

Second Conversation Information Transmission Step (S109)

The second conversation information is transmitted, for example, from the smart phone to the notebook computer.

Then, the notebook computer (first voice analysis terminal 3) receives the second conversation information transmitted from the smart phone (second voice analysis terminal 5).

Conversation Section Obtaining Step (S110)

The conversation sections in the first conversation information and the second conversation information may be analyzed to obtain one or a plurality of the conversation sections. The conversation section may be analyzed in each terminal. Meanwhile, collectively analyzing the conversation sections of the conversation information recorded in the two terminals by the notebook computer (first voice analysis terminal) allows obtaining the corresponding conversation sections between the first conversation information and the second conversation information, and therefore is preferred. In this case, the respective conversation sections of the first conversation information are almost the same as the respective conversation sections of the second conversation information in conversation time. Therefore, matching the respective sections using timing means is preferred. Thus, the first conversation information is divided into sections and also the respective corresponding conversation sections of the second conversation information can be obtained.

The conversation section obtaining unit 33 may also analyze the conversation section in the second conversation information to obtain one or a plurality of the conversation sections.

The first conversation information is analyzed to conversational sentences like "Now the XYZ as a new medicine for diabetes will be described." "Does it lower the Duel blood. ('the Duel blood' in kanji characters is incorrect in this case)".

The second conversation information is analyzed to conversational sentences like "Now the XYZ 'TONYUBYO NI KANSURU SHINYAKU' will be described. Does it lower the blood glucose level? ('TONYUBYO NI KANSURU SHINYAKU' in kanji characters is incorrect in this case)".

Conversation Section Selection Step (S111)

The number of related terms included in the first conversation information and the number of related terms included in the second conversation information in the respective conversation sections are compared, and the conversation section with the larger number of related terms is employed as the correct conversation section.

In the above-described example, the first conversation section of the first conversation information (for example, "Now the XYZ as a new medicine for diabetes will be described.") is employed as the correct conversation section.

Similarly, the second conversation section of the second conversation information ("Does it lower the blood glucose level?") is employed as the correct conversation section.

The continuation of the conversation sections thus employed is stored in the storage unit.

The continuation of the conversation sections is "Now the XYZ as a new medicine for diabetes will be described." "Does it lower the blood glucose level?"

Figure 4:
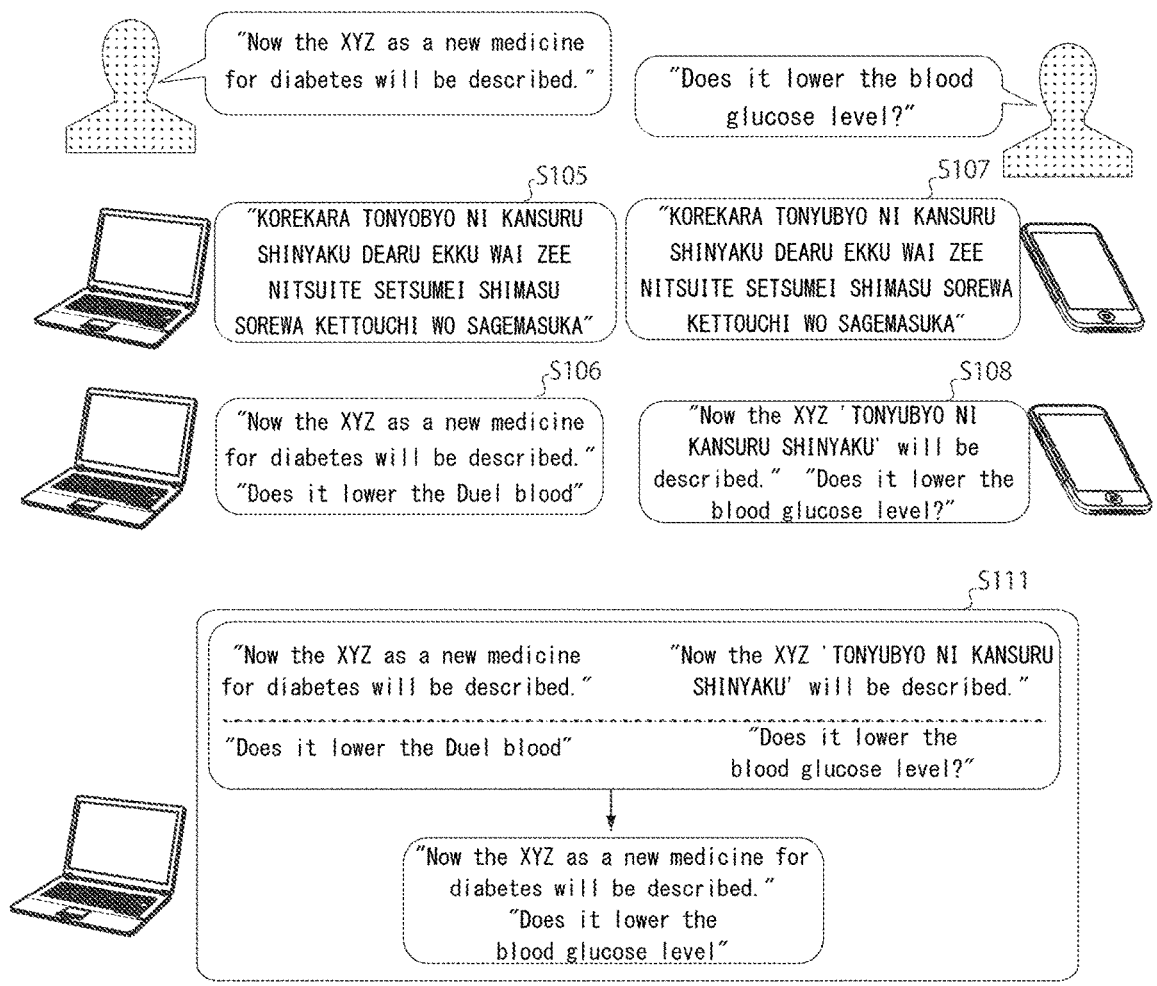
FIG. 4 is a conceptual diagram illustrating a second process example of the voice analysis system.

FIG. 4 is a conceptual diagram illustrating a second process example of the voice analysis system. In this example, the second voice analysis terminal analyzes the conversation sections, and the second conversation information in which the conversation section has been analyzed is transmitted to the first voice analysis terminal. In this example as well, to avoid inconsistency of the conversation sections, it is preferred that the respective conversation sections are associated with the clock time information and stored and are transmitted from the second voice analysis terminal to the first voice analysis terminal together with the clock time information. Then, the first voice analysis terminal can match the conversation sections included in the first conversation information with the conversation sections included in the second conversation information.

Figure 5:
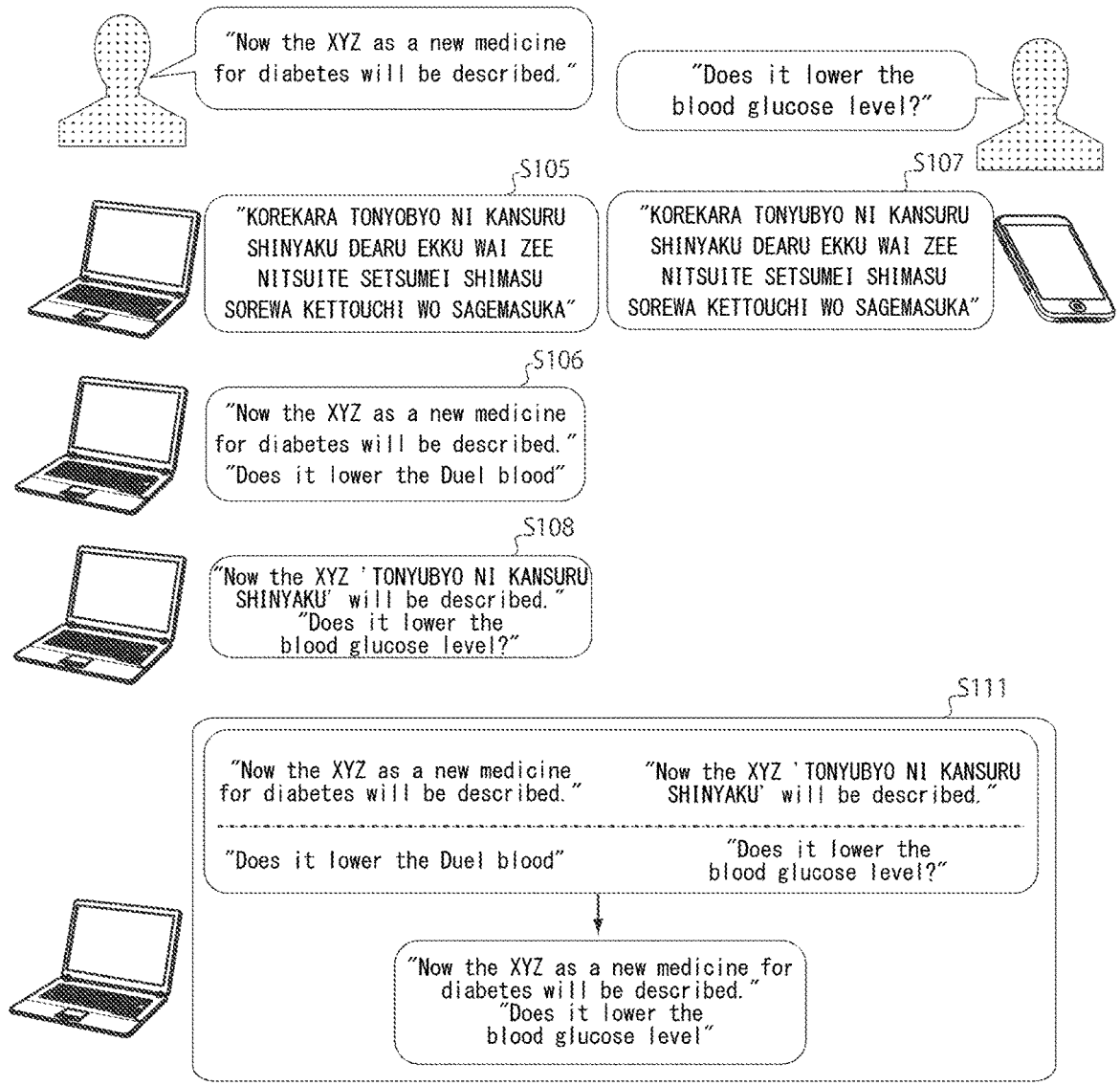
FIG. 5 is a conceptual diagram illustrating a third process example of the voice analysis system.

FIG. 5 is a conceptual diagram illustrating a third process example of the voice analysis system. In this example, the second voice analysis terminal picks up the sound, digitalized conversation information is transmitted to the first voice analysis terminal, and the first voice analysis terminal performs various kinds of analysis. Note that although not particularly illustrated, not only the first voice analysis terminal but also the second voice analysis terminal may analyze the correct conversation section.

INDUSTRIAL APPLICABILITY

This system can be used as a voice analysis device. Especially, a voice analysis device, such as a Google speaker (registered trademark), probably becomes further popular in the future. Additionally, the voice analysis device is assumed to be mounted on a terminal familiar with a user, such as a smart phone and a mobile terminal. For example, a case where noise different from a voice of the user is recorded in the voice analysis device and the voice of the user is less likely to be recorded is assumed. Meanwhile, even in such a case, a terminal present close to the user probably can appropriately record the voice of the user. Then, the terminal close to the user records sound information and shares the sound information with the voice analysis device, thus ensuring analyzing the voice with further high accuracy.

DESCRIPTION OF REFERENCE SIGNS

1 Voice analysis system
3 First voice analysis terminal
5 Second voice analysis terminal
7 First term analysis unit
9 First conversation storage unit
11 Analysis unit
13 Presentation storage unit
15 Related term storage unit
17 Display unit
21 Second term analysis unit
23 Second conversation storage unit
25 Conversation information reception unit
31 Specific presentation information obtaining unit
33 Conversation section obtaining unit
35 Related term extraction unit
37 Conversation section selection unit
41 Clock time storage unit
43 Frequency analysis unit
45 Incorrect conversion term storage unit
51 Second analysis unit
53 Second presentation storage unit
55 Second related term storage unit
57 Second display unit
59 Second conversation information reception unit
61 Second specific presentation information obtaining unit
63 Second conversation section obtaining unit
65 Second related term extraction unit
67 Second conversation section selection unit

The invention claimed is:
1. A voice analysis system comprising:
a first voice analysis terminal; and
a second voice analysis terminal, wherein
the first voice analysis terminal is a terminal that includes:
a first term analysis unit configured to analyze a word included in a conversation to obtain first conversation information;
a first conversation storage unit configured to store the first conversation information, which is obtained by the first term analysis unit;
a conversation analysis unit configured to analyze the first conversation information stored by the first conversation storage unit;
a presentation storage unit configured to store a plurality of presentation materials;
a related term storage unit configured to store related terms related to each of the plurality of presentation materials stored in the presentation storage unit; and
a display unit configured to display any of the presentation materials stored by the presentation storage unit,
the second voice analysis terminal is a terminal that includes:
a second term analysis unit configured to analyze the word included in the conversation to obtain second conversation information; and
a second conversation storage unit configured to store the second conversation information, which is obtained by the second term analysis unit,
the first voice analysis terminal further includes:
a conversation information reception unit configured to receive the second conversation information, which is obtained by the second term analysis unit, from the second voice analysis terminal,
the first conversation storage unit is configured to also store the second conversation information received by the conversation information reception unit, and
the conversation analysis unit includes:
a specific presentation information obtaining unit configured to receive information on a selection of a specific presentation material as a certain presentation material among the plurality of presentation materials;
a conversation section obtaining unit configured to analyze a conversation section in the first conversation information, which is obtained by the first term analysis unit, to obtain one or a plurality of conversation sections;
a related term extraction unit configured to extract related terms that are related to the specific presentation material and included in the first conversation information which is obtained by the first term analysis unit, and/or in the second conversation information, which is obtained by the second term analysis unit; and
a conversation section selection unit configured to compare a number of related terms included in the first conversation information with a number of related terms included in the second conversation information in each of the one or the plurality of conversation sections obtained by the conversation section obtaining unit, the conversation section selection unit being configured to employ a conversation section with a larger number of related terms as a correct conversation section.

2. The voice analysis system according to claim 1, wherein
the first voice analysis terminal further includes a clock time storage unit configured to store a clock time and a period,
the first conversation information, which is obtained by the first term analysis unit, includes a clock time related to each of words included in the conversation, and
the conversation section obtaining unit is configured to analyze the conversation section using clock time which relates to each of the words included in the conversation.

3. The voice analysis system according to claim 1, wherein
the first voice analysis terminal further includes a frequency analysis unit configured to analyze a frequency of a voice related to each word included in the conversation,
the first conversation information, which is obtained by the first term analysis unit, includes the frequency of the voice related to the each word included in the conversation, and
the conversation section obtaining unit is configured to analyze the conversation section using the frequency of the voice related to each word included in the conversation.

4. The voice analysis system according to claim 1, wherein
each of the related terms stored by the related term storage unit includes a presenter related term and a listener related term, and
the conversation section obtaining unit is configured to use the presenter related term and the listener related term to analyze the conversation section in the first conversation information, which is obtained by the first term analysis unit.

5. The voice analysis system according to claim 1, wherein
the first voice analysis terminal further includes an incorrect conversion term storage unit configured to store an incorrect conversion term related to each of the plurality of presentation materials, and
the conversation analysis unit is configured such that when the incorrect conversion term related to a specific one of the plurality of presentation materials is included, the conversation analysis unit corrects an incorrect conversion term included in the correct conversation section using a correct conversion term corresponding to the incorrect conversion term included in the correct conversation section.

6. The voice analysis system according to claim 1, wherein
the second voice analysis terminal further includes:
a second conversation analysis unit configured to analyze the second conversation information stored by the second conversation storage unit;
a second presentation storage unit configured to store a plurality of presentation materials as second presentation materials;
a second related term storage unit configured to store related terms related to the second presentation materials;
a second display unit configured to display any of the presentation materials stored by the second presentation storage unit; and
a second conversation information reception unit configured to receive the first conversation information, which is obtained by the first term analysis unit, from the first voice analysis terminal,
the second conversation storage unit is configured to also store the first conversation information received by the second conversation information reception unit, and
the second conversation analysis unit includes:
a second specific presentation information obtaining unit configured to receive information on a selection of a second specific presentation material as a certain presentation material among the second presentation materials;
a second conversation section obtaining unit configured to analyze a conversation section in the second conversation information, which is obtained by the second term analysis unit, to obtain one or a plurality of conversation sections in the second conversation information;
a second related term extraction unit configured to extract related terms that are related to the second specific presentation material and included in the first conversation information which is obtained by the first term analysis unit and/or in the second conversation information, which is obtained by the second term analysis unit; and
a second conversation section selection unit configured to compare a number of related terms included in the first conversation information with a number of related terms included in the second conversation information, which is obtained by the second term analysis unit, in each of the one or the plurality of conversation sections obtained by the second conversation section obtaining unit, and the second conversation section selection unit is configured to employ a conversation section with a larger number of related terms as a correct conversation section.

* * * * *